United States Patent
Kittaka et al.

(10) Patent No.: US 9,906,658 B2
(45) Date of Patent: Feb. 27, 2018

(54) IMAGE PROCESSING SYSTEM INCLUDING BLANK PAGE IDENTIFIER, IMAGE PROCESSING APPARATUS, AND IMAGE PROCESSING METHOD

(71) Applicants: Fumiyoshi Kittaka, Kanagawa (JP); Junki Aoki, Kanagawa (JP); Takuya Mori, Tokyo (JP); Itaru Kodaira, Kanagawa (JP); Yukinori Ishii, Kanagawa (JP); Tomohiro Kuroyanagi, Tokyo (JP); Koichiro Maemura, Kanagawa (JP); Masaki Tasaka, Kanagawa (JP)

(72) Inventors: Fumiyoshi Kittaka, Kanagawa (JP); Junki Aoki, Kanagawa (JP); Takuya Mori, Tokyo (JP); Itaru Kodaira, Kanagawa (JP); Yukinori Ishii, Kanagawa (JP); Tomohiro Kuroyanagi, Tokyo (JP); Koichiro Maemura, Kanagawa (JP); Masaki Tasaka, Kanagawa (JP)

(73) Assignee: RICOH COMPANY, LTD., Tokyo (JP)

( * ) Notice: Subject to any disclaimer, the term of this patent is extended or adjusted under 35 U.S.C. 154(b) by 2 days.

(21) Appl. No.: 15/001,376

(22) Filed: Jan. 20, 2016

(65) Prior Publication Data
US 2016/0234393 A1    Aug. 11, 2016

(30) Foreign Application Priority Data

Feb. 5, 2015   (JP) ................................. 2015-020911

(51) Int. Cl.
*H04N 1/00*   (2006.01)

(52) U.S. Cl.
CPC ..... *H04N 1/00212* (2013.01); *H04N 1/00114* (2013.01); *H04N 1/00233* (2013.01);
(Continued)

(58) Field of Classification Search
USPC ....... 358/1.9, 3.2–3.23, 1.15–1.18, 504, 505, 358/405, 406, 440, 448, 462, 464
See application file for complete search history.

(56) References Cited

U.S. PATENT DOCUMENTS

| | | | | |
|---|---|---|---|---|
| 2012/0147406 A1* | 6/2012 | Yamaneki | .......... | H04N 1/00217 358/1.13 |
| 2012/0154853 A1* | 6/2012 | Otake | ...................... | H04N 1/41 358/1.15 |

(Continued)

FOREIGN PATENT DOCUMENTS

| | | |
|---|---|---|
| JP | 9-018628 | 1/1997 |
| JP | 2000-092261 | 3/2000 |
| JP | 2012-129910 | 7/2012 |

*Primary Examiner* — Marcellus Augustin
(74) *Attorney, Agent, or Firm* — Harness, Dickey & Pierce, P.L.C.

(57) ABSTRACT

An image processing system includes an image scanner that scans an image on a document into image data, a destination accepting unit that accepts selection of a destination that the image data is transferred by a first user, the destination at least corresponding to a user other than the first user selecting the destination, a blank page detector that detects a blank page in the image data, an image data processor that removes the detected blank page from the image data to generate blank page removed data and blank page data of the detected blank page, a specification unit that specifies a first destination of the first user, and a transmitter that transfers the blank page removed data to the destination corresponding to the user other than the first user and transfers the blank page removed data and the blank page data to the first destination of the first user.

15 Claims, 8 Drawing Sheets

| INFORMATION RECEIVED BY TRANSFERRED CONTENT GENERATOR | | INFORMATION GENERATED BY TRANSFERRED CONTENT GENERATOR | |
|---|---|---|---|
| IMAGE DATA | DESTINATION | MAIL BODY | ATTACHMENT FILE |
| "IMAGE DATA WITHOUT BLANK PAGE" | DESTINED FOR USER WHO COMMANDED TO TRANSFER | NORMAL BODY | "IMAGE DATA WITHOUT BLANK PAGE" |
| | OTHER DESTINATIONS | NORMAL BODY | "IMAGE DATA WITHOUT BLANK PAGE" |
| "DATA THAT BLANK SHEET IS REMOVED" AND "BLANK PAGE DATA" | DESTINED FOR USER WHO COMMANDED TO TRANSFER | ADD DESCRIPTION THAT BLANK PAGE DATA IS REMOVED AUTOMATICALLY TO NORMAL BODY | "DATA THAT BLANK SHEET IS REMOVED" AND "BLANK PAGE DATA" |
| | OTHER DESTINATIONS | NORMAL BODY | "DATA THAT BLANK SHEET IS REMOVED" |

(52) U.S. Cl.
CPC ............ *H04N 2201/0039* (2013.01); *H04N 2201/0068* (2013.01); *H04N 2201/0094* (2013.01)

(56) References Cited

U.S. PATENT DOCUMENTS

| | | |
|---|---|---|
| 2013/0027736 A1 | 1/2013 | Kittaka |
| 2014/0160530 A1 | 6/2014 | Kittaka |
| 2014/0344371 A1* | 11/2014 | Schiller ............... H04L 51/18 709/206 |
| 2014/0362407 A1 | 12/2014 | Sasaki et al. |
| 2015/0070726 A1 | 3/2015 | Umezawa et al. |
| 2015/0156348 A1 | 6/2015 | Kittaka et al. |
| 2015/0156371 A1* | 6/2015 | Yokomizo .......... H04N 1/00766 358/452 |
| 2015/0286445 A1 | 10/2015 | Kittaka |

* cited by examiner

| USER DATA STORAGE UNIT | | | |
|---|---|---|---|
| USER ID | PASSWORD | MAIL ADDRESS | ... |
| user01 | 1111 | user01@example.cpm | ... |
| user02 | 2222 | user02@example.cpm | ... |
| user03 | 3333 | user03@example.cpm | ... |
| ... | ... | ... | ... |

FIG. 5

| INFORMATION RECEIVED BY TRANSFERRED CONTENT GENERATOR | | INFORMATION GENERATED BY TRANSFERRED CONTENT GENERATOR | |
|---|---|---|---|
| IMAGE DATA | DESTINATION | MAIL BODY | ATTACHMENT FILE |
| "IMAGE DATA WITHOUT BLANK PAGE" | DESTINED FOR USER WHO COMMANDED TO TRANSFER | NORMAL BODY | "IMAGE DATA WITHOUT BLANK PAGE" |
| | OTHER DESTINATIONS | NORMAL BODY | "IMAGE DATA WITHOUT BLANK PAGE" |
| "DATA THAT BLANK SHEET IS REMOVED" AND "BLANK PAGE DATA" | DESTINED FOR USER WHO COMMANDED TO TRANSFER | ADD DESCRIPTION THAT BLANK PAGE DATA IS REMOVED AUTOMATICALLY TO NORMAL BODY | "DATA THAT BLANK SHEET IS REMOVED" AND "BLANK PAGE DATA" |
| | OTHER DESTINATIONS | NORMAL BODY | "DATA THAT BLANK SHEET IS REMOVED" |

FIG. 6

DOCUMENT HAS BEEN SENT TO YOU.
SENT DOCUMENT IS ATTACHED TO THIS E-MAIL.

FIG. 7

DOCUMENT HAS BEEN SENT TO YOU.
SENT DOCUMENT IS ATTACHED TO THIS E-MAIL.
NOTE THAT BLANK SHEET HAS BEEN REMOVED.
DOCUMENT WITH REMOVED BLANK SHEET ONLY
IS ALSO ATTACHED.

| SELECTED OPTION | OPERATION CHANGED FROM OPERATION IN FIG. 9 |
|---|---|
| A | BLANK PAGE DATA IS NOT ATTACHED TO E-MAIL IN S39 (BLANK PAGE DATA IS NOT ALSO GENERATED IN S36) |
| B | 1. STORE BLANK PAGE DATA IN PREDETERMINED STORAGE UNIT AFTER S36 AND ACQUIRE REFERENCE INFORMATION (LINK INFORMATION) TO ACCESS STORED DATA<br>2. ADD LINK INFORMATION TO BLANK PAGE DATA TO BODY OF E-MAIL INSTEAD OF ATTACHING BLANK PAGE DATA TO E-MAIL IN S39 |
| C | 1. STORE EACH OF BLANK PAGE REMOVED DATA AND BLANK PAGE DATA IN PREDETERMINED STORAGE UNIT AND ACQUIRE REFERENCE INFORMATION (LINK INFORMATION) TO ACCESS STORED DATA<br>2. ADD LINK INFORMATION TO BLANK PAGE REMOVED DATA AND LINK INFORMATION TO BLANK PAGE DATA TO BODY OF E-MAIL INSTEAD OF OPERATION IN S39<br>3. ADD LINK INFORMATION TO BLANK PAGE REMOVED DATA TO BODY OF E-MAIL INSTEAD OF OPERATION IN S42 |
| D | PERFORM MODIFICATION OF OPTION C IF TOTAL SIZE OF BLANK PAGE REMOVED DATA AND BLANK PAGE DATA GENERATED IN S36 (NEARLY EQUAL TO SIZE OF IMAGE DATA RECEIVED FROM MFP) IS EQUAL TO OR MORE THAN X MB |
| E | NONE |

IMAGE PROCESSING SYSTEM INCLUDING BLANK PAGE IDENTIFIER, IMAGE PROCESSING APPARATUS, AND IMAGE PROCESSING METHOD

CROSS-REFERENCE TO RELATED APPLICATION

This patent application is based on and claims priority pursuant to 35 U.S.C. § 119(a) to Japanese Patent Application No. 2015-020911, filed on Feb. 5, 2015 in the Japan Patent Office, the entire disclosure of which is hereby incorporated by reference herein.

BACKGROUND

Technical Field

The present invention relates to an image processing system, an image processing apparatus, and an image processing method.

Background Art

A technology that attaches image data of a document scanned by a scanner function in a digital multifunction peripheral (hereinafter referred to as "MFP") to e-mail and transfers the e-mail to an e-mail destination address is known.

In addition, a technology that removes blank pages automatically, generates data that blank pages are removed (blank page removed data), generates blank page data that were removed automatically, and transfers the blank page removed data, the blank page data, and notice information indicating a result of deleting blank pages automatically is known.

SUMMARY

Example embodiments of the present invention provide a novel image processing system that includes an image scanner that scans an image on a document into image data to be transferred, a destination accepting unit that accepts selection of a destination to which the image data is transferred by a first user, the destination at least corresponding to a user other than the first user selecting the destination, a blank page detector that detects a blank page in the image data to be transferred, an image data processor that removes the detected blank page from the image data to be transferred to generate blank page removed data and blank page data of the detected blank page, a specification unit that specifies a first destination of the first user, and a transmitter that transfers the blank page removed data to the destination corresponding to the user other than the first user and transfers the blank page removed data and the blank page data to the first destination of the first user.

Further example embodiments of the present invention provide an image processing apparatus and an image processing method.

BRIEF DESCRIPTION OF THE DRAWINGS

A more complete appreciation of the disclosure and many of the attendant advantages thereof will be readily obtained as the same becomes better understood by reference to the following detailed description when considered in conjunction with the accompanying drawings.

DETAILED DESCRIPTION

In describing preferred embodiments illustrated in the drawings, specific terminology is employed for the sake of clarity. However, the disclosure of this patent specification is not intended to be limited to the specific terminology so selected, and it is to be understood that each specific element includes all technical equivalents that have the same function, operate in a similar manner, and achieve a similar result.

In the existing technologies, in case of an image processing system that one apparatus includes a document scanner and another apparatus includes an e-mail transmitter and the other apparatus including the e-mail transmitter detects and removes blank pages, it is difficult to notify a user who commands to scan a document that the document includes a blank page when the blank page is detected.

In this case, if the e-mail transmitter adds a description telling that the blank page has been removed automatically to a main body of the e-mail and transfers the e-mail attaching data of the blank page removed automatically and data that removed blank pages, it is possible to notify the user that the blank page is removed.

Here, that is not an issue if a destination of the e-mail is the user who commands to scan the document. However, that could be a problem if the destination of the e-mail includes other users, especially in case the e-mail is transferred to multiple addresses simultaneously.

That is, to users to whom the document is distributed using e-mail, the description that the blank page has been removed automatically and the data of the removed blank pages are unnecessary information. In addition, the size of e-mail becomes large by attaching that information to the e-mail.

In the embodiments described below, an image processing system that can notify the user who commands to scan the document that the blank page has been removed appropriately if the apparatus including the e-mail transmitter detects and removes the blank page automatically is provided.

Figure 1:
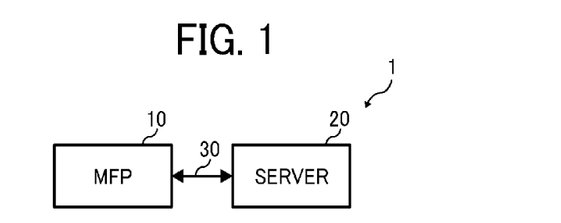
FIG. 1 is a diagram illustrating an overall configuration of an image processing system as an embodiment of the present invention.

FIG. 1 is a diagram illustrating an overall configuration of an image processing system in this embodiment.

The image processing system 1 in FIG. 1 includes a MFP 10 and a server 20 connected with each other via a communication channel 30. Among those components, the MFP 10 is an image processing apparatus that implements various functions such as a scanner function, a print function, a copy function, a facsimile communication, and a document storage etc. The server 20 is an information processing apparatus that can perform various information processing based on a command received from an external apparatus such as the MFP 10.

As the characteristic of this embodiment, the MFP 10 includes a function that processes a scanned document using the scanner function to image data based on a command from a user who wants to transfer the image data to arbitrary destinations including the user himself/herself. In addition, the MFP 10 can transfer the image data along with destination information indicating one or more destinations designated by the user (that can include the user himself/herself as the destination) to the server 20 via the communication channel 30.

As the characteristic of the embodiment, the server 20 includes a function that generates e-mail attaching image data based on the image data and the destination information received from the MFP 10 and transfers the e-mail to destination addresses that the destination information indicates (i.e., mail addresses in this case).

A wired/wireless communication channel in accordance with arbitrary specification can be used as the communication channel 30. Not only network communication but also peer-to-peer communication can be used as the communication channel 30.

Figure 2:
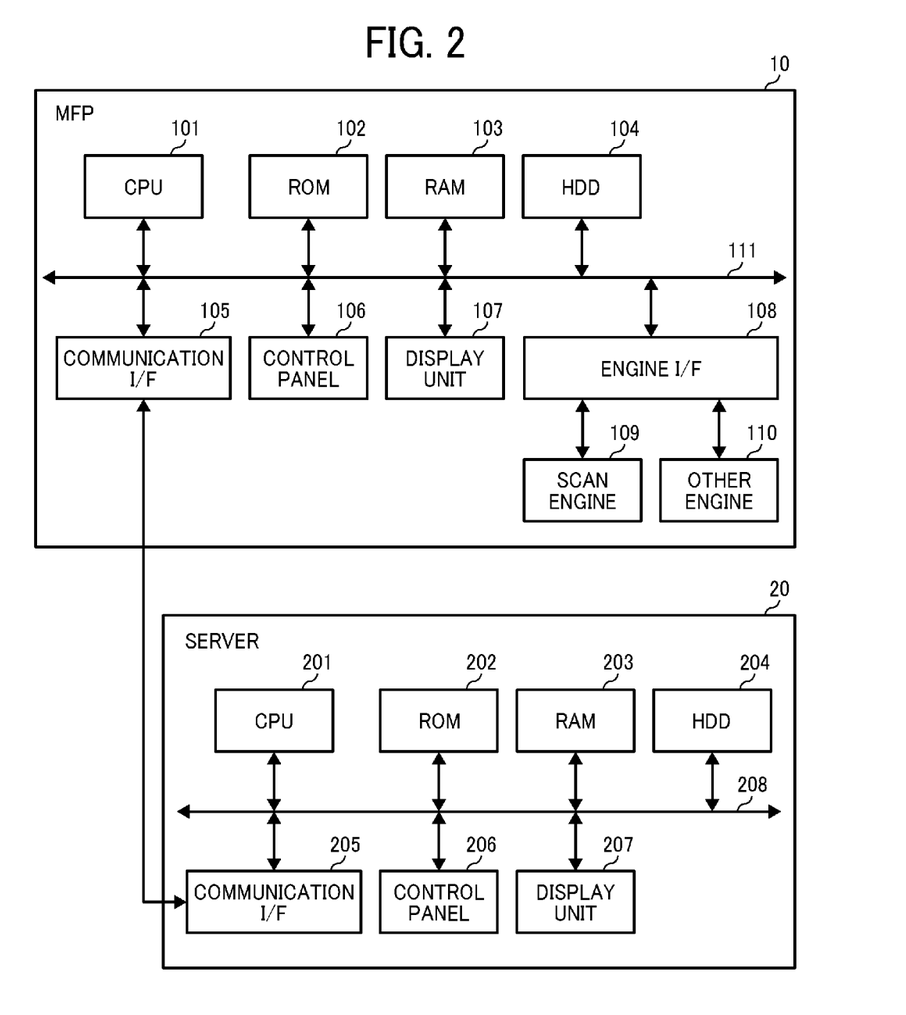
FIG. 2 is a diagram illustrating a hardware configuration of a multifunction peripheral (MFP) and a server in the image processing system in FIG. 1 as an embodiment of the present invention.

FIG. 2 is a diagram illustrating a hardware configuration of the MFP and the server 20 in FIG. 1 in this embodiment.

The MFP 10 includes a CPU 101, a ROM 102, a RAM 103, a hard disk drive (HDD) 104, a communication interface (I/F) 105, a control panel 106, a display unit 107, and an engine I/F 108, and those components are connected with each other via a system bus 111. A scan engine 109 and other engine 110 are connected to the engine I/F 108.

The CPU 101 controls the entire MFP 10 by executing a program stored in the ROM 102 or the HDD 104 using the RAM 103 as a work area, and various functions (such as functions described later with reference to FIG. 3) can be implemented.

The ROM 102 and the HDD 104 are non-volatile storage media (storing units) and store various programs executed by the CPU 101 and various data (described in detail later).

The communication I/F 105 is an interface for communicating with other apparatuses via the communication channel 30. It is possible to use an interface that complies with a specification of the network to be used etc.

The control panel 106 is an operational unit for accepting user operation. The control panel 106 includes various keys, switches, and a touch panel and accepts various user operation on a graphical user interface (GUI) displayed on the display unit 107.

The display unit 107 is an indicating unit that indicates the GUI described above, an operational condition of the MFP 10, configuration settings of the MFP 10, and various messages etc. to users, and the display unit 107 includes a liquid crystal display and lamps etc.

It should be noted that the control panel 106 and the display unit 107 can be omitted if the MFP 10 does not accept user operation directly (i.e., the MFP 10 accepts user operation and displays information using an external apparatus connected via the communication I/F 105 in that case).

The engine I/F 108 is an interface that connects the scan engine 109 and the engine 110 to the system bus 111 so that the CPU 101 can control the scan engine 109 and the engine 110. The scan engine 109 is an image scanning unit that scans a document and obtains its image data. Other engine 110 is a module to implement mechanical functions other than the functions implemented by the scan engine 109. For example, it is possible to include a print engine that forms an image on paper based on image data as the other engine 110.

The server 20 includes a CPU 201, a ROM 202, a RAM 203, a HDD 204, a communication I/F 205, a control panel 206, and a display unit 207, and those components are connected with each other via a system bus 208.

The components described above correspond to components in the MFP 10.

The image processing system 1 including the MFP 10 and the server 20 described above obtains image data by scanning a document set on the scan engine 109 based on a user command and transfers the image data attached to e-mail to multiple designated destinations (including the user himself/herself). The function that scans a document and transfers image data attached to e-mail is known as a scan to e-mail function for example.

In addition, in transferring the e-mail, the image processing system 1 generates blank page data that includes blank pages only and blank page removed data that blank pages are removed from the original image data after detecting the blank pages if the image data obtained by scanning includes the blank pages (data). In this case, the image processing system 1 transfers the e-mail attaching the blank page data and the blank page removed data to the destination of the user himself/herself and transfers the e-mail attaching the blank page removed data only to destination other than the user.

Figure 3:
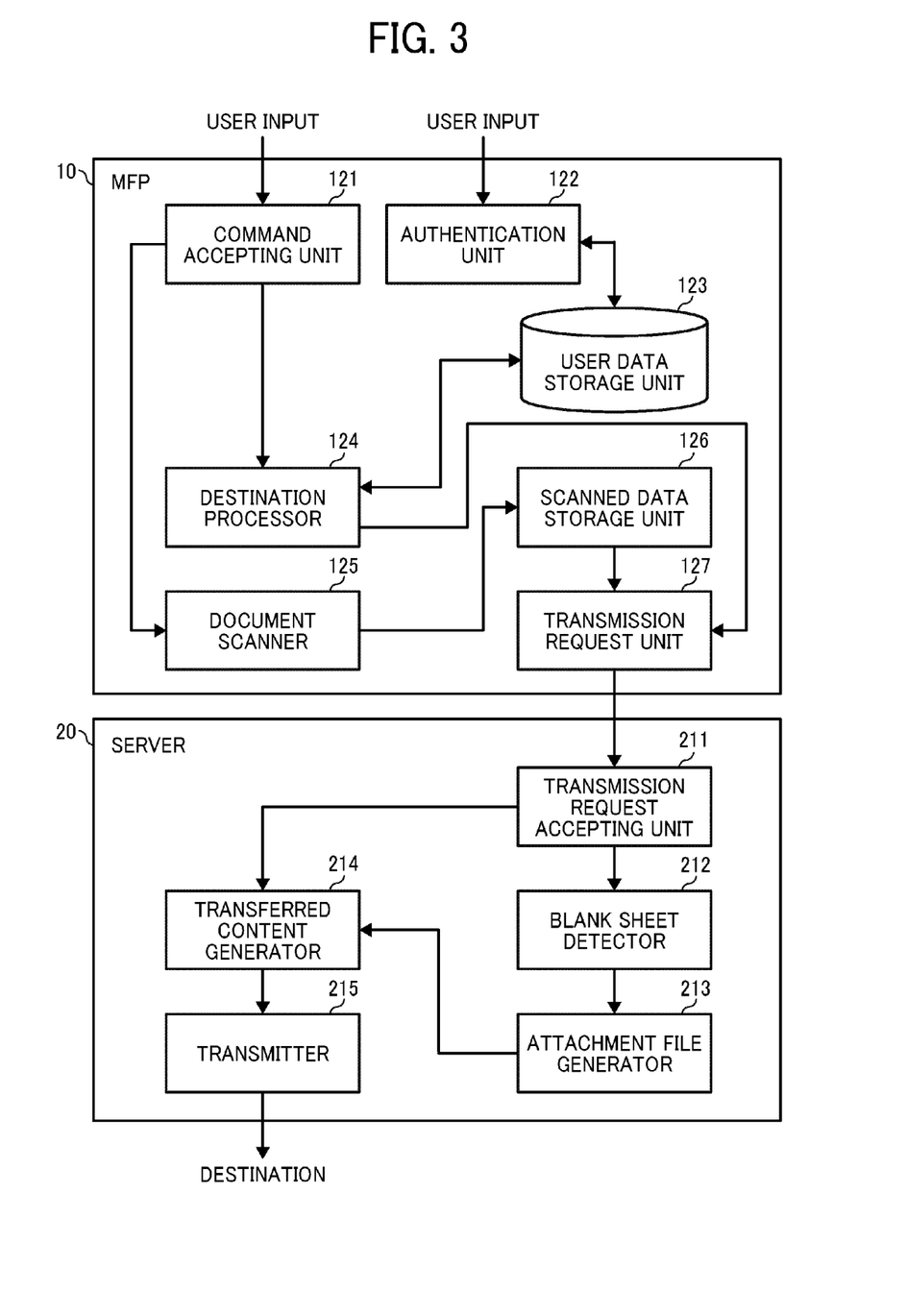
FIG. 3 is a diagram illustrating functional blocks regarding functions that remove a blank page and transfer the blank page included in the MFP and the server in the image processing system in FIG. 1 as an embodiment of the present invention.

FIG. 3 is a diagram illustrating functional blocks regarding functions that remove a blank page and transfer the blank page included in the MFP 10 and the server 20 in this embodiment. The CPU 101 in the MFP 10 or the CPU 201 in the server 20 controls hardware appropriately to implement the functions shown in FIG. 3.

The MFP 10 includes a command accepting unit 121, an authentication unit 122, a user data storage unit 123, a destination processor 124, a document scanner 125, a scanned data storage unit 126, and a transmission request unit 127.

The command accepting unit 121 accepts a transmission command that commands to scan a document and transfer the scanned image data to a desired destination using e-mail via a predetermined operation screen by user operation.

The command accepting unit 121 accepts information on specifying one or more destinations (i.e., mail address itself or identification information for obtaining mail address by searching through an address book) and acquisition method of image data to be transferred (e.g., by scanning a document etc.). In case of accepting the information on specifying destinations, the command accepting unit 121 functions as a destination accepting unit.

It should be noted that the document includes not only paper documents but also images etc. In addition, the command accepting unit 121 can accept scanning conditions of documents (e.g., document size, image quality, and color settings etc.) at this point.

The authentication unit 122 includes a function of user authentication. If a setting that the MFP 10 requests authentication in using the MFP by user operation is enabled, the authentication unit 122 authenticates a user before the command accepting unit 121 accepts the command of designating destinations. More specifically, for example, the authentication unit 122 accepts input of authentication information such as a user ID and password etc. by user operation. After comparing the authentication information with authentication information stored in the user data storage unit 123, if corresponding authentication information is found, the authentication unit 122 authenticates the user who inputs the authentication information as an authorized user who has authority to use the MFP 10. It is possible to authenticate a user by using an IC card or a biometric authentication technology.

If the setting that the MFP 10 requests authentication is disabled, it is possible to command the command accepting unit 121 to transfer e-mail by user operation without the authentication by the authentication unit 122.

Figure 4:
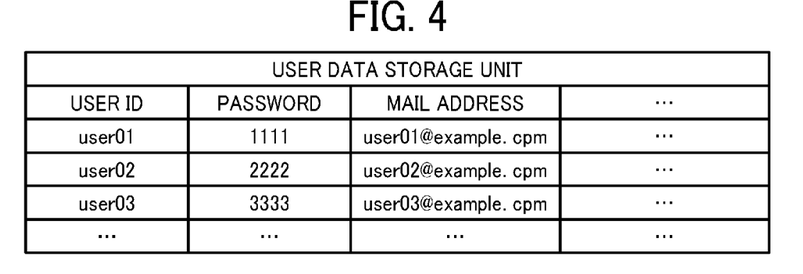
FIG. 4 is a diagram illustrating user data as an embodiment of the present invention.

As information on users who has authority to use the MFP 10, as shown in FIG. 4, the user data storage unit 123 stores authentication information such as a user ID and a password used for the user authentication. In addition to the authentication information, the user data storage unit 123 can store information on user attribution and destination such as a user name, a user organization, user authority, and mail address etc. associated with a user. In FIG. 4, mail address is stored in the user data storage unit 123 as an example.

The user data storage unit 123 can be included in an internal memory of the MFP 10. Otherwise, it is possible to use an external HDD or a storage area in an external apparatus including a cloud environment for the user data storage unit 123.

If the user destination is included in destinations designated in the transmission command accepted by the command accepting unit 121, the destination processor 124 specifies that matter.

If the user is authenticated by the authentication unit 122, it is possible to obtain the user's mail address from the user data storage unit 123. Therefore, if the mail address is included in the destinations, it is possible to specify that the destination is to the user who commands to transfer the image data.

By contrast, if the user is not authenticated, it is possible to input the user's mail address by user operation by displaying a pop-up screen etc. on the display unit 107 by the destination processor 124. Otherwise, it is possible to input information on which destination is to the user himself/herself (or if the user's own destination is included) among the designated destinations by user operation. By using that information, the destination processor 124 can specify the user's destination who commands to transfer the image data.

In response to the command accepting unit 121's acceptance of a transfer command, the document scanner 125 controls the scan engine 109 to obtain image data by scanning a document to be transferred and functions as an image scanning unit. It is possible to use the scanning conditions set in the transfer command. If blank pages are included in the scanned document, image data including the blank pages is obtained.

Here, the blank page means a page that the entire color is approximately one color and no information such as text, graphics, and pictures is written except streaks, spots, and noises etc.

Other standards for defining the blank page such as the entire color is almost the same as a background color estimated from colors on other pages or the entire color is almost uniform etc. can be adopted. It is possible that the definition of blank pages is configured in advance. It is also possible to select the definition of blank pages on demand by user operation.

The scanned data storage unit 126 stores the image data scanned by the document scanner 125 in a storage area included in the ROM 102 etc. in the MFP 10. In this embodiment, after the image data that the document scanner 125 scans is stored in the scanned data storage unit 126 temporarily, the image data is transferred to the transmission request unit 127 (described later).

It is possible that the scanned data storage unit 126 keeps the image stored temporarily so that the image processing system 1 can use the image after the transmission.

The scanned data storage unit 126 can be included in an internal memory of the MFP 10. Otherwise, it is possible to use an external HDD or a storage area in an external apparatus including a cloud environment for the scanned data storage unit 126.

The transmission request unit 127 transfers the destination information that the destination to the user who commands to transfer the image data (if it exists) is specified and the image data to be transferred stored in the scanned data storage unit 126 to the transmission request accepting unit 211 in the server 20 and functions as a transmission request unit that requests to transfer the image data in accordance with the information described above.

The functions included in the MFP 10 are described below.

Next, the server 20 includes a transmission request accepting unit 211, a blank page detector 212, an attachment file generator 213, a transferred content generator 214, and a transmitter 215.

The transmission request accepting unit 211 accepts request for transferring the scanned image data using e-mail along with the image data to be transferred and destination information indicating the destination of the image data. In this case, the transmission request accepting unit 211 accepts the destination information distinguishing between the destination of the user himself/herself who commands to transfer the image data and other destinations.

Before transferring the accepted image data, the transmission request accepting unit 211 passes the image data to the blank page detector 212 to instruct the blank page detector to detect a blank sheet. In addition, the transmission request accepting unit 211 passes the destination information to the transferred content generator 214 to instruct the transferred content generator 214 to generate e-mail for transferring the image data to the designated destination.

The blank page detector 212 analyzes the image data accepted from the transmission request accepting unit 211 to detect blank pages in the image data.

After detecting the blank page, the blank page detector 212 passes information on which page the blank page exists in the image data and the image data to the attachment file generator 213. In case of detecting no blank page, the blank page detector 212 passes information indicating that no blank page exists and the image data to the attachment file generator 213.

Based on the information passed by the blank page detector 212, the attachment file generator 213 generates "blank page removed data" that the blank page is removed from the original image data passed by the blank page detector 212 and "blank page data" as image data of the removed image data. In addition, the attachment file generator 213 passes the generated data to the transferred content generator 214. In case of receiving information indicating that there is no blank page from the blank page detector, the attachment file generator 213 passes the original image data itself as "image data without blank page" to the transferred content generator 214.

In accordance with the command from the transmission request accepting unit 211, the transferred content generator 214 generates e-mail for transferring the image data to the destination indicated by the destination information. The content of the e-mail generated by the transferred content generator 214 is different depending on the destination passed by the transmission request accepting unit 211 and the attachment file passed by the attachment file generator 213.

Figure 5:
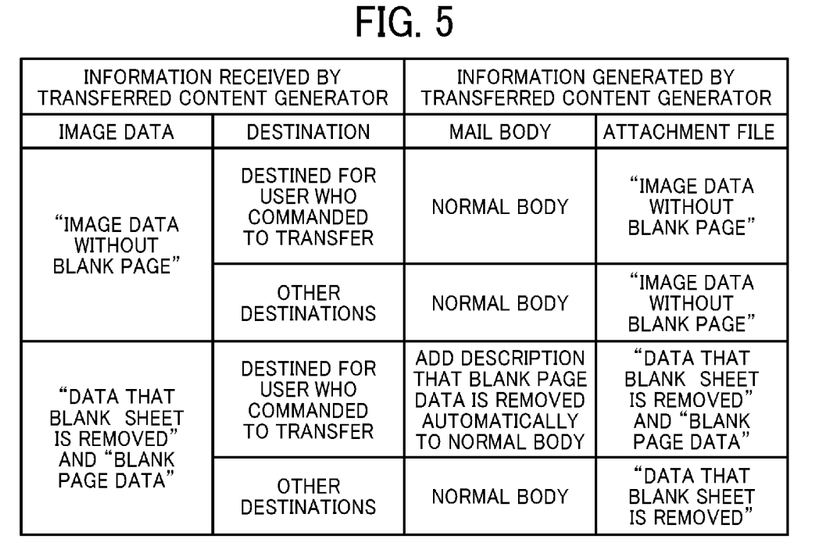
FIG. 5 is a diagram illustrating data generated by a transferred content generator in FIG. 3 as an embodiment of the present invention.
Figure 6:
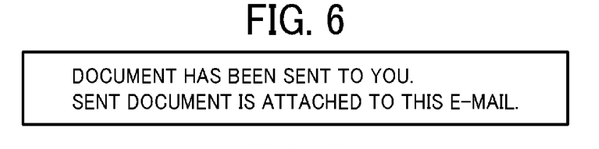
FIG. 6 is a diagram illustrating e-mail generated by the transferred content generator in FIG. 3 as an embodiment of the present invention.
Figure 7:
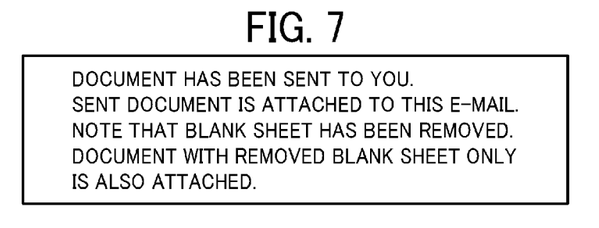
FIG. 7 is a diagram illustrating another e-mail as an embodiment of the present invention.

FIG. 5 is a diagram illustrating the content of the e-mail generated by the transferred content generator 214 in each case. FIG. 6 is a diagram illustrating e-mail including a normal body, and FIG. 7 is a diagram illustrating e-mail adding a description that blank page data is removed automatically. Those operations are described in detail later.

The transferred content generator 214 passes the generated e-mail described above to the transmitter 215 to instruct the transmitter to transfer the e-mail to the destinations.

The transmitter 215 transfers the e-mail passed by the transferred content generator 214 to the destinations described in the e-mail. The transferred content generator 214 and the transmitter 215 function as a transmission unit.

Next, the content of the e-mail generated by the transferred content generator 214 is described below in detail.

FIG. 5 is a diagram illustrating contents of e-mail generated by a transferred content generator in accordance with the received information in each of the cases described above.

The content of the e-mail generated by the transferred content generator 214 is different depending on receiving whether "the image data without blank page" or "the blank page removed data and the blank page data" from the attachment file generator 213.

In the former case, it is unnecessary to report that the blank page is removed. Therefore, it is unnecessary to distinguish the destination of the user himself/herself who commands to transfer the image data from the other destinations. As a result, e-mail that "the image data without blank page" passed by the attachment file generator 213 is attached to a normal body shown in FIG. 6 is generated to all destinations passed by the transmission request accepting unit 211. Here, "the normal body" is a template document describing that the image data is distributed and the image data is attached to this e-mail.

The e-mail generated here is for transferring the image data obtained by scanning the document by the MFP 10 attached as the attachment file to all destinations designated by user operation on the MFP 10.

By contrast, in the latter case, e-mail transferred to the destination of the user himself/herself who commands to transfer the image data is generated separately from e-mail transferred to the other destinations.

First, in the main body of the e-mail transferred to the destination of the user himself/herself who commands to transfer the image data, a description that blank page data is automatically removed is added to the normal main body shown in FIG. 7 to notify the user that blank page is removed. "The blank page data" is attached in addition to "the blank page removed data" as attachment files. The purpose of the operation is that the user who commands to transfer the image data can check the content of the removed page.

Next, the main body of the e-mail transferred to the other destinations is the same as shown in FIG. 6. The purpose of the operation is that it is not mentioned that the blank page is removed since it is unnecessary to report that the blank page is removed to other users since that is rather redundant information. In addition, only "the blank page removed data" as the image of the document to be transferred is attached. The purpose of the operation is to reduce the size of the e-mail since it is meaningless to transfer "the blank page data".

Next, operation performed by the CPU 101 in the MFP 10 and the CPU 201 in the server 20 is described below in relation to the units in the image processing system 1 described above.

Figure 8:
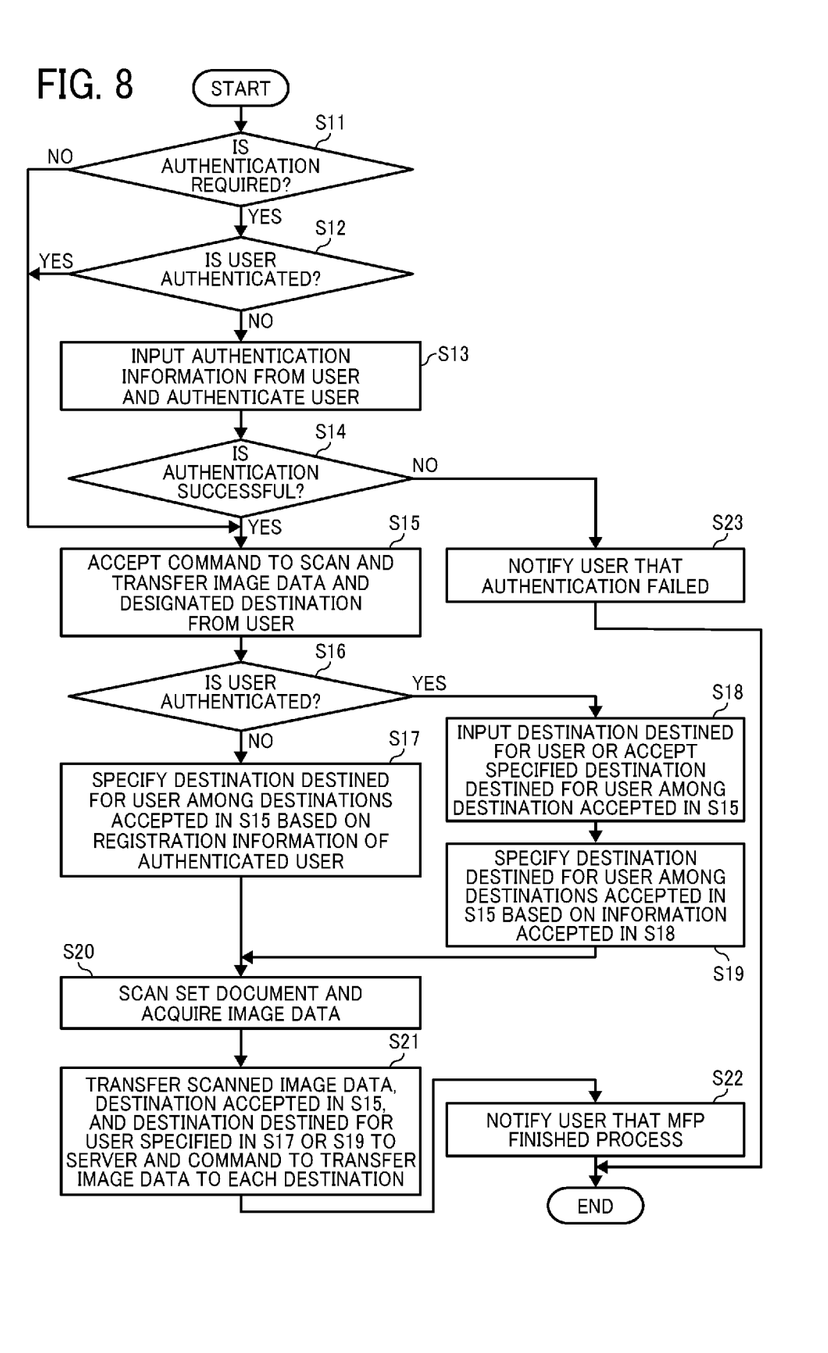
FIG. 8 is a flowchart illustrating operation executed by the CPU in the MFP in FIG. 2 after accepting a command from a user as an embodiment of the present invention.

FIG. 8 is a flowchart illustrating operation executed by the CPU 101 in the MFP 10.

The operation in FIG. 8 is started by the CPU 101 if a mode that instructs to obtain image data by scanning a document and to transfer the obtained image data to designated destination is selected by user operation on the MFP 10.

In FIG. 8, first, the CPU 101 determines whether or not authentication is required before accepting a command by user operation in that mode in S11. The determination can be performed based on a setting of MFP 10.

If it is required to perform the authentication, the CPU 101 determines whether or not the user who is currently operating the MFP 10 is authenticated in S12. If the user is not authenticated, the authentication is performed after accepting authentication information by user operation in S13. Step S13 corresponds to the function of the authentication unit 122.

After the authentication, if it is determined that the authentication is successful (YES in S14), the CPU 101 accepts a command to scan and transfer the image data and the destination where the image data is transferred in S15. Step S15 corresponds to the function of the command acceptance unit 121. In case of NO in S11 or YES in S12, the process proceeds to S15 and the similar operation is performed.

Next, after S15, the CPU 101 again determines whether or not the user who is currently operating the MFP 10 (who issued the command in S15) is authenticated in S16. In case of YES in S16, the CPU 101 obtains a mail address of the authenticated user from registered information stored in the user data storage unit 123 and specifies the destination of the user himself/herself who commands to transfer the image data among the destinations accepted in S15 in S17.

By contrast, in case of NO in S16, the CPU 101 accepts input of the destination of the user himself/herself or specification of the destination of the user himself/herself among the destination accepted in S15 by user operation who issued the command in S15 in S18. It is required that the either of them is accepted. Subsequently, based on the information accepted in S18, the CPU 101 specifies the destination of the user himself/herself who commands to transfer the image data among the destination accepted in S15 in S19.

In case of NO in S11, it is possible that the case in S16 becomes NO. In this case, the user who commands to transfer the image data is unknown, and it is possible that the destination of the user is not registered in the MFP 10. Therefore, the user is instructed to input or specify the destination of the user himself/herself.

The operation from S16 through S19 corresponds to the function of the destination processor 124.

After performing the operation in S17 or S19, the CPU 101 drives the scan engine 109 to scan the image on the document set on a document holder and obtains the image data in S20. The operation in S20 corresponds to the function of the document scanner 125 and the scanned data storage unit 126.

After that, the CPU 101 transfers the scanned image data obtained in S20, the destinations accepted in S15, and the destination of the user himself/herself specified in S17 or S19 and commands to transfer the image data to the destinations in S21. Step S21 corresponds to the function of the transmission request unit 127.

Next, the CPU 101 notifies the user that the MFP 10 finishes the operation regarding the commanded transmission in S22, and the process in FIG. 8 ends.

In case of NO in S14, the CPU 101 notifies the user that the authentication failed in S23, and the process in FIG. 8 ends. It is possible to display a message etc. on the display unit 107 to perform the notification described above.

Figure 9:
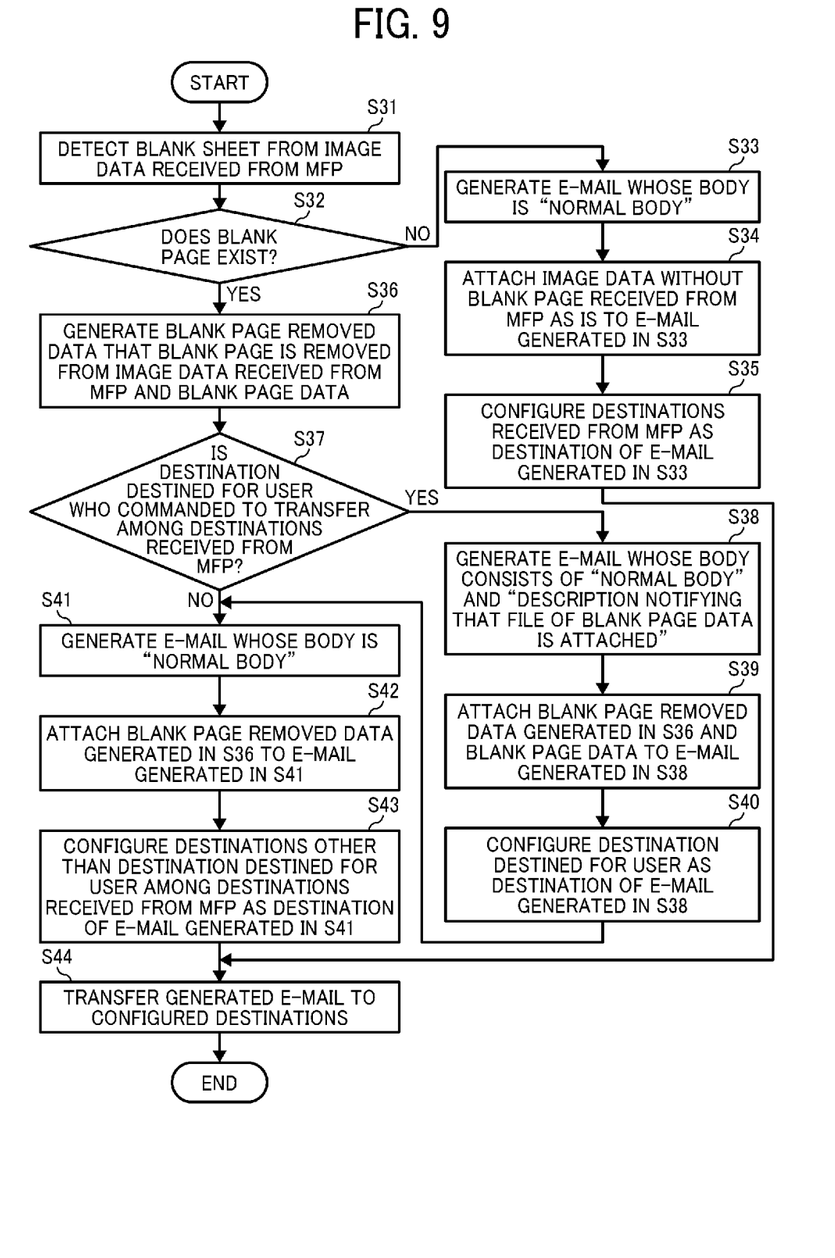
FIG. 9 is a flowchart illustrating operation executed by the CPU in the server in FIG. 2 after accepting a request from the MFP as an embodiment of the present invention.

FIG. 9 is a flowchart illustrating operation executed by the CPU 201 in the server 20.

In case of detecting that the server 20 receives the data transferred by the MFP 10 in S21 in FIG. 8, the CPU 201 starts the operation in FIG. 9.

In FIG. 9, first, the CPU 201 detects a blank page in the image data received from the MFP 10 in S31. Step S31 corresponds to the function of the blank page detector 212.

If the blank page does not exist (NO in S32), the CPU 201 transfers the image data received from the MFP 10 attached to the e-mail to the destinations received from the MFP 10.

That is, e-mail with a normal body in FIG. 6 is generated in S33, the image data without a blank page received from the MFP 10 as is is attached to the e-mail in S34, and the destinations received from the MFP 10 are set as the destinations of the generated e-mail in S35. By transferring the e-mail in S44, the CPU 101 can transfer the image data to the destination in accordance with the request from the MFP 10.

The operation from S33 through S35 corresponds to the function of the transferred content generator 214, and S44 corresponds to the function of the transmitter 215.

By contrast, if the blank page exists in S32 (YES in S32), the CPU 201 generates the blank page removed data that the detected blank page is removed from the received image data and the blank page data as data of the detected blank page in S36. S36 corresponds to the function of the attachment file generator 213.

Next, the CPU 201 proceeds to operation after S37 regarding e-mail transmission if the blank page exists. In this case, first, the CPU 201 determines whether or not the destination of the user himself/herself who commands to transfer the image data exists among the destinations received from the MFP 10 in S37. If the destination of the user himself/herself exists, the MFP 10 should have specified the destination. Therefore, it is possible to perform the determination in S37 depending on whether or not that is specified by the MFP 10.

In case of YES in S37, the CPU 201 transfers the image data commanded to transfer to the destination of the user himself/herself who commands to transfer the image data and notify the user that the blank page is removed.

That is, as shown in FIG. 7, the e-mail whose body consists of "the normal body" and "the part reporting that a file of the blank page data is attached" is generated in S38. Subsequently, the blank page removed data and the blank page data generated in S36 are attached to e-mail in S39, and the destination of the user himself/herself who commands to transfer the image data is configured as the destination for the e-mail generated in S38 in S40. The operation from S38 through S40 corresponds to the function of the transferred content generator 214. By transferring the e-mail in S44, the CPU 101 can transfer the image data in accordance with the request from the MFP 10 to the user who commands to transfer the image data and notify the user that the blank page is removed in transferring the e-mail.

By contrast, in case of NO in S37 and after S40, in accordance with the command from the MFP 10, the CPU 201 transfers the e-mail attaching the image data to the destinations other than the user himself/herself who commands to transfer the image data (all destinations if the destination of the user himself/herself does not exist) received from the MFP 10. It should be noted that the blank page removed data is transferred here. It is assumed that the MFP 10 issued the request including the removal of the blank page.

In this case, the CPU 201 generates the e-mail whose main body is "the normal body" in FIG. 6 in S41, and the blank page removed data generated in S36 is attached to the e-mail generated in S41 in S42. Subsequently, the destinations other than the destination of the user himself/herself who commands to transfer the image data among the destinations received from the MFP 10 is configured as the destination for the generated e-mail in S43. The operation from S41 through S43 corresponds to the function of the transferred content generator 214. By transferring the e-mail in S44, the CPU 101 can transfer the image data to the destination other than the destination of the user himself/ herself who commands to transfer the image data in accordance with the request from the MFP 10. In this case, in the transferred image data, while the blank page is removed from the actual scanned image data, that is not reported to the destinations After S44 described above, the CPU 201 finishes the operation in FIG. 9.

By performing the operation in FIGS. 8 and 9, in case of detecting the blank page in the image data to be transferred, the image processing system 1 can transfer the blank page removed data to the destinations other than the user himself/ herself among the destinations designated by the user and transfer the blank page removed data and the blank page data to the destination of the user himself/herself.

Figure 10:
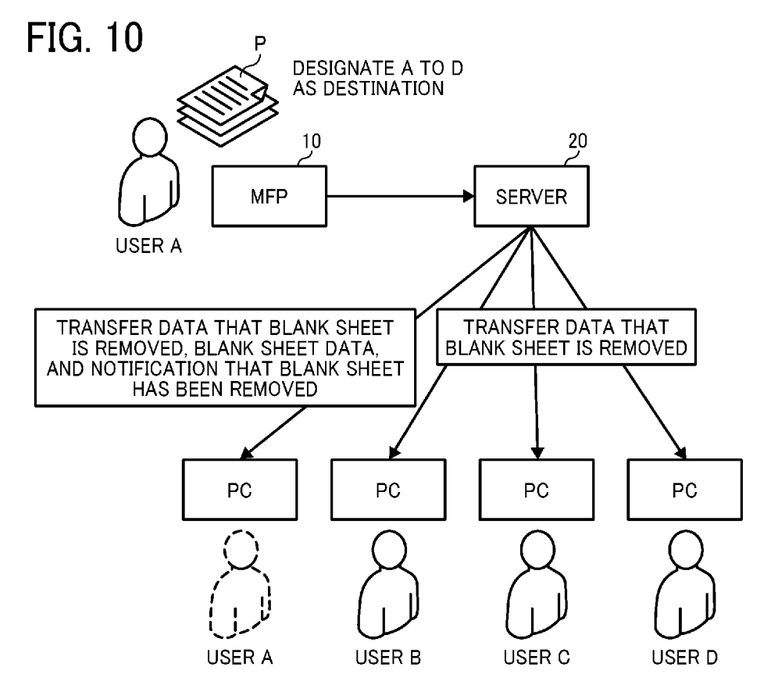
FIG. 10 is a diagram illustrating an effect as an embodiment of the present invention.

That is, for example, as shown in FIG. 10, it is assumed that the user A commands the MFP 10 to scan a document P and transfer image data of the document P to four users, i.e., users A to D. In this case, if blank page is mixed in the document P, the server 20 removes the blank page from the scanned image data automatically and transfers the blank page removed data after the removal to three users other than user A. By contrast, in addition to the blank page removed data, the removed blank page data and the description that the blank page is removed are transferred to the user who commands to transfer the image data.

By performing the operation described above, it is possible to report the information on the blank page data to the user who commands to transfer only, and the user can check the content of the blank page data. By contrast, users other than the user who commands to transfer the image data can skip labor to check the redundant information.

In addition, it is possible to reduce data size of the transferred e-mail as a whole, and it is possible to reduce burden on the mail server. Furthermore, it is possible to prevent a memory in computers that receive e-mail from storing redundant data.

Next, another embodiment of the present invention is described below.

In this embodiment, it is possible to choose the way that the server 20 transfers the blank page data and the blank page removed data to the predetermined destinations from some options by user operation. While the options described below are alternative, it is possible to choose all of the options, and it is possible to choose some of the options.

Figure 11:
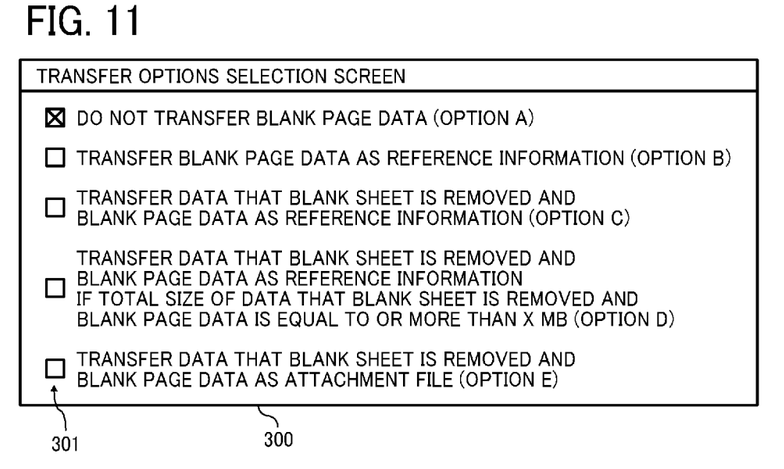
FIG. 11 is a diagram illustrating a screen that the MFP accepts a selection of a method of transferring blank page data and blank page removed data by user operation as an embodiment of the present invention.

FIG. 11 is a diagram illustrating a screen that the MFP 10 accepts a selection of a method of transferring the blank page data and the blank page removed data by user operation in this embodiment.

If it is commanded to configure the method of transferring the blank page data and the blank page removed data by user operation, the MFP 10 displays a transfer options selection screen 300 in FIG. 11 on the display 107. In the transfer options selection screen 300, it is possible to select any one of options A to E as the method of transferring the blank page data and the blank page removed data alternatively using check boxes 301 on the left. In FIG. 11, the option A is selected.

The CPU 101 in the MFP 10 stores the option selected in the transfer options selection screen 300 in a predetermined memory and transfers information on which option is selected in addition to the image data etc. to the server 20 in S21 in FIG. 8.

Figure 12:
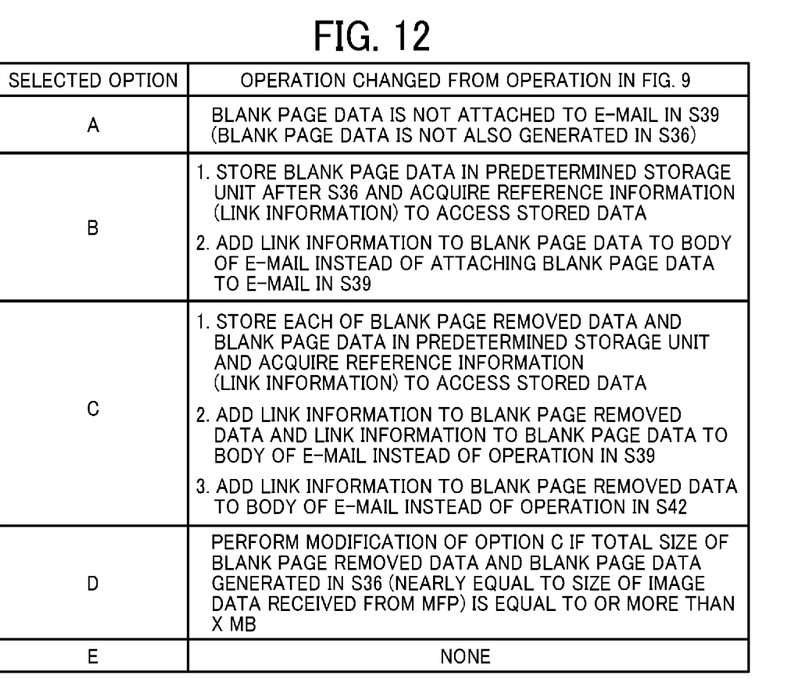
FIG. 12 is a diagram illustrating modifications of the operation in FIG. 9 in accordance with the option accepted in the screen in FIG. 11 as an embodiment of the present invention.

After receiving the information transferred in S21 in FIG. 8, when the CPU 201 in the server 20 starts the operation in FIG. 9, the CPU 201 modifies the operation in FIG. 9 as shown in FIG. 12 in accordance with the selected option.

Here, contents of the options shown in FIG. 11 are described below from the top option.

First, in a top option A, the blank page data is not transferred. In this case, the blank page removed data is transferred just like the first embodiment described above.

If the option A is selected, the CPU 201 in the server 20 does not attach the blank page data to the e-mail in S39 in FIG. 9 and does not transfer the blank page data to the user who commands to transfer the image data.

In FIG. 9, while the blank page data is transferred to the user who commands to transfer the image data for confirmation, the blank page data basically includes almost informationless data to be checked. Therefore, if there is no need for the confirmation, by selecting the option of not transferring the blank page data, it is possible to reduce the size of e-mail, burden on the mail server, and consumption of communication bandwidth.

Since the blank page data is transferred using various ways in all of other options, the MFP 10 functions as a first configuration unit that configures whether or not the transmission of the blank page data is enabled by storing the information on whether or not the option A is selected.

Next, in a second option B, the blank page data is transferred as reference information (link information).

If the option B is selected, the CPU 201 in the server 20 stores the blank page data that is transferred attached to the e-mail in FIG. 9 in a predetermined storage unit that the recipient of the e-mail can access after S36. In S39, instead of attaching the blank page data itself, reference information for accessing the blank page data stored in the storage unit is added to the main body of the e-mail. With reference to the described reference information if required, the recipient of the user who receives the e-mail generated as described above can access the predetermined storage unit to obtain the blank page data.

Examples of the storage unit are the HDD 204 in the server 20 and a document server on a network including cloud environment. In addition, it is possible to describe the reference information as link information including Uniform Resource Locator (URL) for accessing data using a web browser. Otherwise, it is also possible to describe the reference information as a search command for obtaining the blank page data by searching through a database.

Next, in a third option B, the blank page removed data and the blank page data are transferred as reference information (link information).

If the option C is selected, the CPU 201 in the server 20 stores the blank page removed data in addition to the blank page data in a predetermined storage unit that the recipient of the e-mail can access after S36 in FIG. 9. Instead of S39, reference information for accessing the blank page removed data and accessing the blank page data stored in the storage unit is added to the main body of the e-mail. In addition, instead of S42, reference information for accessing the blank page data is added to the main body of the e-mail.

With reference to the described reference information if required, the recipient of the user who receives the e-mail generated as described above can access the predetermined storage unit to obtain the blank page removed data and/or the blank page data. In this case, the storage unit and the reference information are just the same as in the option B.

As described above, by performing the transmission using the reference information, it is possible to reduce the e-mail size drastically compared to attaching the blank page data etc., and it is possible to save the storage size of the mail server. In addition, since the recipient of the e-mail can download the data if required, it is possible to save the storage size of the terminal that receives the e-mail. For example, in case of scanning a document that consists of not blank pages but almost blank pages, it is possible to obtain the blank page data only if it is required to examine the blank page data.

In a fourth option D, if a total size of the blank page removed data and the blank page data is equal to or more than a predetermined threshold, i.e., X MB, these data is transferred as the reference information (link information).

When the option D is selected, the CPU 201 in the server 20 modifies the operation in FIG. 9 just like the case of the option C if the total size of the blank page removed data and the blank page data generated in S36 is equal to or more than X MB. It is considered that the total size described above is almost equal to the size of the image data received from the MFP 10, so it is possible to consider the size of the image data as a standard.

In case of transferring the data using the reference information, it is required that the user who receives the e-mail accesses the storage unit and downloads the desired data, and that might be troublesome in some cases. To cope with this issue, if the data size is small in the option D, the data is transferred as the attachment file just like the case in FIG. 9, and the transmission using the reference information is performed only if the data size is large. As a result, it is possible both to prevent the storage size from running out and to reduce the troublesome.

By storing the information on whether or not the options B to D is selected, the MFP 10 functions as a second configuration unit that can configure to transfer the blank page data using the reference information, and the MFP 10 functions as third configuration unit that can configure to transfer the blank page removed data using the reference information.

In a last option E, just like the first embodiment described above, it is specified that the blank page removed data and the blank page data are always transferred as attachment files.

In FIG. 11, the selection of the method of transferring the blank page data and the blank page removed data is accepted. Similarly, it is possible to select the method of transferring the image data if the blank page is not detected. In addition, the same transmission method selected for the blank page removed data can be applied to the transmission of the image data in case the blank page is not detected.

In the embodiment described above, the specific configuration of the apparatuses, the specific sequence of the processes, the data configuration, the displayed content on the screen, the method and content of the notification etc. are not limited to the above description.

For example, in the e-mail transferred in the operation in FIG. 9, if the destination of the user who commands to transfer the image data is known, it is possible to set the destination as the sender of the e-mail.

Figure 13:
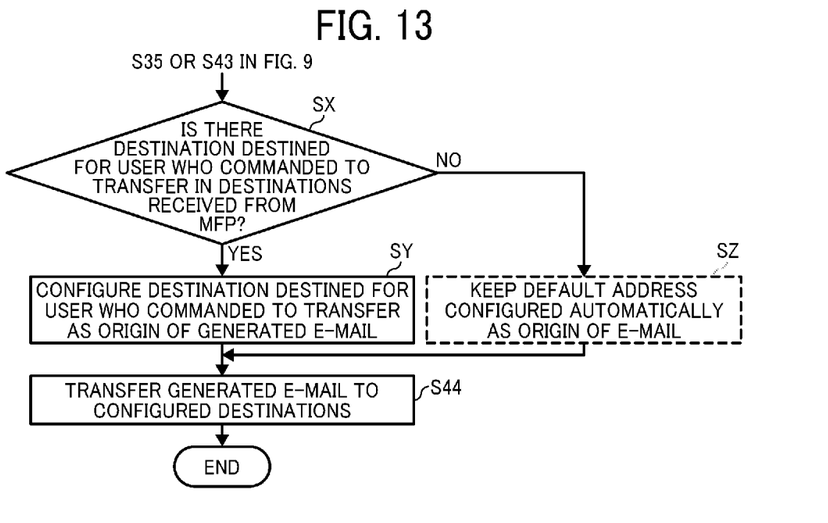
FIG. 13 is a diagram illustrating operation modified from the operation in FIG. 9 as an embodiment of the present invention.

In this case, as shown in FIG. 13, it is possible to add the operation of SX and SY after S35 and S43 and before S44 in FIG. 9. That is, just like S37, the CPU 201 in the server 20 determines whether or not the destination of the user himself/herself is included in SX. In the case of YES in SX, it is possible that the destination is configured as the sender of the generated e-mail in SY. In the case of NO in SX, if the sender of the e-mail is not modified, the sender of the e-mail is the default address that is configured automatically when the e-mail is generated in SZ. For example, the administrator address of the MFP 10 is the default address.

Since the image data is transferred along with the intention of the user who commands to transfer the image data, it is preferable that the user receives an inquiry about the transmission etc. Therefore, if the destination of the user is known, by setting the destination as the sender of the e-mail, the recipient of the e-mail can inquire about the transmission etc. by replying to the received e-mail, and that is more preferable. It is preferable that the default address is set if the destination of the user who commands to transfer the image data is not known.

In the embodiments described above, the image processing system 1 that includes the MFP 10 and the server 20 connected with each other via the communication channel 30 is described. However, assignment of the functions included in the apparatuses is not limited to that. It is possible that the functions in FIG. 3 are distributed to more than three apparatuses. Otherwise, it is possible that one apparatus includes all functions.

Figure 14:
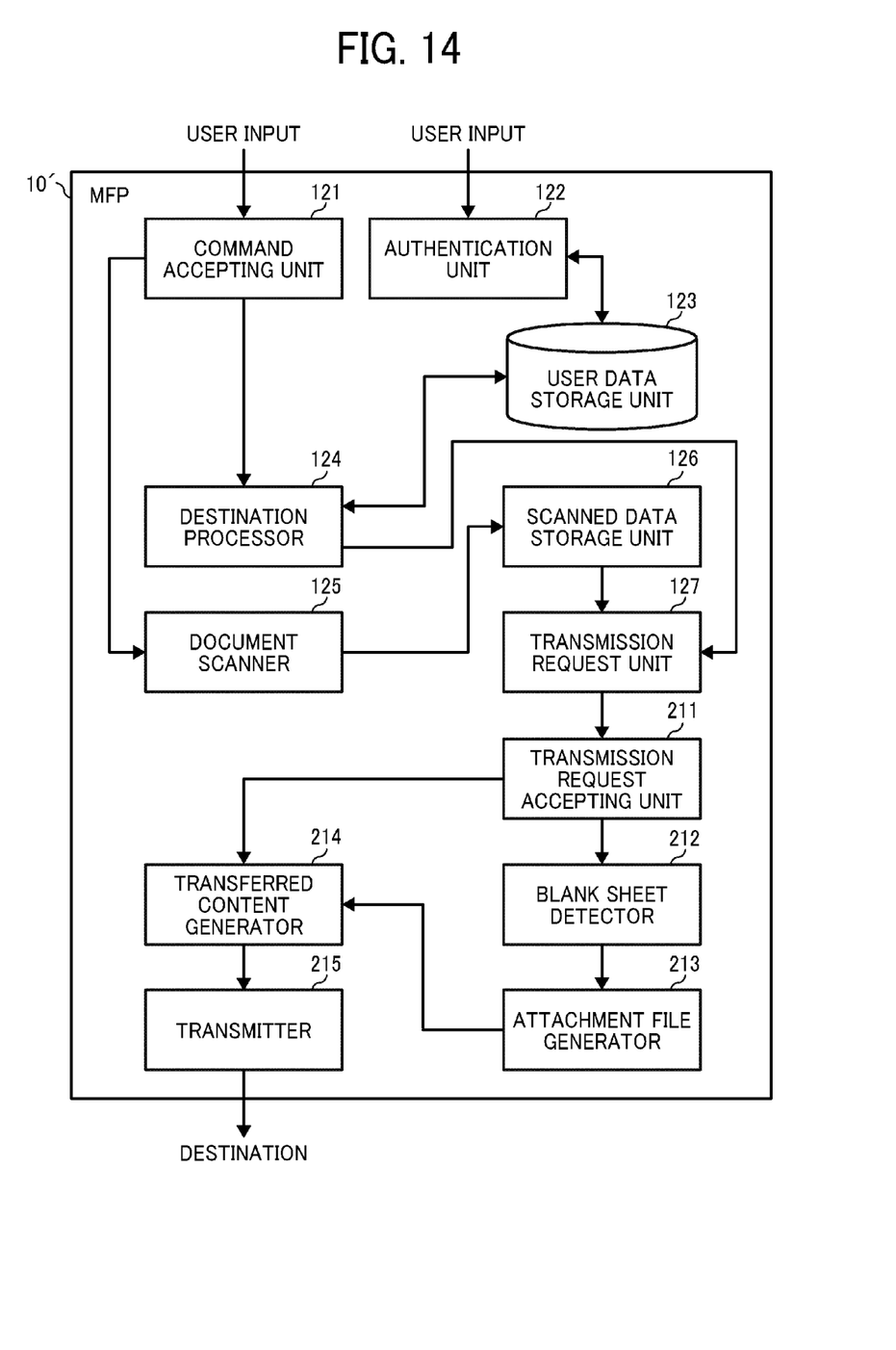
FIG. 14 is a diagram illustrating functional blocks of the MFP that includes both the MFP function and the server function in the image processing system in FIG. 3 as an embodiment of the present invention.

FIG. 14 is a diagram illustrating functional blocks of the MFP 10' that includes the functions both the MFP 10 and the server 20 shown in FIG. 3. The same symbols are assigned to the same configuration units in FIG. 3, and descriptions for those units are omitted. The MFP 10' can also achieve the same effects as described in the above embodiments.

While the embodiments described above are effective if the document scanning apparatus is different from the blank page detection apparatus, it is possible to adopt the configuration shown in FIG. 14.

The embodiments described above can also be adopted if the image data stored in a predetermined storage unit preliminarily is read and transferred instead of obtaining the image data by scanning the document in response to the user request. It is possible that the MFP 10 or the server 20 includes the predetermined storage unit. Otherwise, it is possible to implement the predetermined storage unit externally. In addition, it is possible to obtain the image data by scanning a document at a given point in time. Otherwise, it is possible that an application etc. generates the image data by calculation.

The main body of the e-mail transferred to the destinations is not limited to the case shown in FIGS. 6 and 7. It is possible that the name of the user who commands to transfer the image data as a distribution indicator.

In the embodiments described above, e-mail is used for transferring the image data. If the image data is transferred in other methods, the present invention can be applied. In this case, information for specifying the sender in the adopted transmission method is used as the sender information.

In case of transferring data as the reference information, it is possible that the data cannot be accessed in the storage unit indicated by the reference information after a certain period of time and its storage period is described in the main body of the generated e-mail. In this case, it is possible that the MFP 10 accepts a configuration of the storage period by user operation. Otherwise, it is possible that the storage period is configured as the initial settings of the image processing system 1.

By setting the storage period and deleting the expired data, it is possible to prevent the storage area where the data is stored from running out.

In addition, the function of distributing the image data in the embodiments described above can be implemented by using an information processing apparatus including a general-purpose computer or an information processing system. If image scanning is not required, it is unnecessary to implement the image scanning unit.

The present invention also encompasses a non-transitory recording medium storing a program that executes an image processing method. The image processing method includes the steps of scanning an image on a document into image data to be transferred, accepting selection of a destination to which the image data is transferred by a first user, the destination at least corresponding to a user other than the first user selecting the destination, detecting a blank page in the image data to be transferred, removing the detected blank page from the image data to be transferred, to generate blank page removed data and blank page data of the detected blank page, specifying a first destination of the first user, and transferring the blank page removed data to the destination corresponding to the user other than the first user, and transfer the blank page removed data and the blank page data to the first destination of the first user.

Numerous additional modifications and variations are possible in light of the above teachings. It is therefore to be understood that, within the scope of the appended claims, the disclosure of this patent specification may be practiced otherwise than as specifically described herein.

The computer software can be provided to the programmable device using any storage medium or carrier medium for storing processor-readable code such as a floppy disk, a compact disk read only memory (CD-ROM), a digital versatile disk read only memory (DVD-ROM), DVD recording only/rewritable (DVD-R/RW), electrically erasable and programmable read only memory (EEPROM), erasable programmable read only memory (EPROM), a memory card or stick such as USB memory, a memory chip, a mini disk (MD), a magneto optical disc (MO), magnetic tape, a hard disk in a server, a solid state memory device or the like, but not limited these. The hardware platform includes any desired kind of hardware resources including, for example, a central processing unit (CPU), a random access memory (RAM), and a hard disk drive (HDD). It is also possible to download the program from an external apparatus that includes a storage medium storing the program or stores the program in a storage unit and install the program in the computer to execute the program. The CPU may be implemented by any desired kind of any desired number of processors. The RAM may be implemented by any desired kind of volatile or non-volatile memory. The HDD may be implemented by any desired kind of non-volatile memory capable of storing a large amount of data. The hardware resources may additionally include an input device, an output device, or a network device, depending on the type of apparatus. Alternatively, the HDD may be provided outside of the apparatus as long as the HDD is accessible. In this example, the CPU, such as a cache memory of the CPU, and the RAM may function as a physical memory or a primary memory of the apparatus, while the HDD may function as a secondary memory of the apparatus.

In the above-described example embodiment, a computer can be used with a computer-readable program, described by object-oriented programming languages such as C++, Java (registered trademark), JavaScript (registered trademark), Perl, Ruby, or legacy programming languages such as machine language, assembler language to control functional units used for the apparatus or system. For example, a particular computer (e.g., personal computer, workstation) may control an information processing apparatus or an image processing apparatus such as image forming apparatus using a computer-readable program, which can execute the above-described processes or steps. In the above-described embodiments, at least one or more of the units of apparatus can be implemented as hardware or as a combination of hardware/software combination.

Each of the functions of the described embodiments may be implemented by one or more processing circuits. A processing circuit includes a programmed processor, as a processor includes circuitry. A processing circuit also includes devices such as an application specific integrated circuit (ASIC) and conventional circuit components arranged to perform the recited functions.

The invention claimed is:

1. An image processing system, comprising:
an image scanner to scan an image on a document into image data to be transferred;
memory storing computer-readable instructions; and
one or more processors configured to execute the computer-readable instructions such that the one or more processors are configured to perform operations including,
accepting selection of a destination of an email address to which the image data is transferred by a first user, the destination at least corresponding to a user other than the first user selecting the destination;
detecting a blank page in the image data to be transferred;
removing the detected blank page from the image data to be transferred, to generate blank page removed data and blank page data of the detected blank page;
specifying a first destination of an email address of the first user; and
transmitting an email notification of transfer of a document without notification of the blank page removed data, along with the image data without the detected blank page, to the destination corresponding to the user other than the first user, and transmitting an e-mail notification of transfer of the blank page removed data and the blank page data to the first destination of the first user.

2. The image processing system according to claim 1, wherein the one or more processors configured to authenticate the first user, wherein the destination accepting unit accepts the selection when the first user is the authenticated user, and the specification unit obtains the first destination of the first user based on data associating the first user and the first destination.

3. The image processing system according to claim 1, wherein the one or more processors are further configured to accept a user input of the destination of the user inputting the user selection with the user selection of the destination, and specifying the destination of the user inputting the user selection based on the user input of the accepted destination.

4. The image processing system according to claim 3, wherein the one or more processors configure the destination of the first user as a source of the blank page removed data and transfer the blank page removed data to the destination other than the destination of the first user.

5. The image processing system according to claim 1, wherein the one or more processors configure whether or not the blank page data is transferred,
wherein the one or more processors transfer the blank page data as reference information.

6. The image processing system according to claim 5, wherein the one or more processors transfer the blank page data using first reference information,
wherein the one or more processors store the blank page data in a storage area and transfers the first reference information referring to the stored blank page data instead of transferring the blank page data itself if the one or more processors transfers the blank page data using the reference information.

7. The image processing system according to claim 6, wherein the one or more processors transfer the blank page removed data using second reference information,
wherein the one or more processors store the blank page removed data in a storage area and transfers the second reference information referring to the stored blank page removed data instead of transferring the blank page removed data itself if the one or more processors transfers the blank page removed data using the reference information.

8. The image processing system according to claim 7, wherein that the one or more processors transfer the blank page data using the first reference information and transfer the blank page removed data using the second reference information depending on whether or not a total size of the blank page data and the blank page removed data is equal to or larger than a predetermined threshold value.

9. The image processing system according to claim 1, wherein the one or more processors transfer a notification indicating that the blank page is removed in addition to the blank page removed data and the blank page data to the destination of the first user.

10. An image processing apparatus, comprising:

an image scanner to scan an image on a document into image data to be transferred;

circuitry to accept selection of a destination of an email address to which the image data is transferred by a first user, the destination at least corresponding to a user other than the first user selecting the destination, detect a blank page in the image data to be transferred, remove the detected blank page from the image data to be transferred, to generate blank page removed data and blank page data of the detected blank page, and specify a first destination of an email address of the first user; and additional circuitry to transmit an email notification of transfer of a document without notification of the blank page removed data, along with the image data without the detected blank page, to the destination corresponding to the user other than the first user, and transmit an email notification of transfer of the blank page removed data and the blank page data to the first destination of the first user.

11. The image processing apparatus according to claim 10, wherein the additional circuitry transfers the blank page removed data using second reference information, and wherein the additional circuitry stores the blank page removed data in a storage area and transfers the second reference information referring to the stored blank page removed data instead of transferring the blank page removed data itself if the additional circuitry transfers the blank page removed data using the reference information.

12. The image processing apparatus according to claim 10, wherein the additional circuitry transfers the blank page data using the first reference information and transfers the blank page removed data using the second reference information depending on whether or not a total size of the blank page data and the blank page removed data is equal to or larger than a predetermined threshold value.

13. A method of processing an image, the method comprising the steps of:

scanning an image on a document into image data to be transferred;

accepting selection of a destination of an email address to which the image data is transferred by a first user, the destination at least corresponding to a user other than the first user selecting the destination;

detecting a blank page in the image data to be transferred;

removing the detected blank page from the image data to be transferred, to generate blank page removed data and blank page data of the detected blank page;

specifying a first destination of an email address of the first user; and transmitting an email notification of transfer of a document without notification of the blank page removed data, along with the image data without the detected blank page, to the destination corresponding to the user other than the first user, and transmitting an email notification of transfer of the blank page removed data and the blank page data to the first destination of the first user.

14. The method of processing an image according to claim 13, further comprising transferring the blank page removed data using second reference information, and storing the blank page removed data in a storage area and transferring the second reference information referring to the stored blank page removed data instead of transferring the blank page removed data itself if the additional circuitry transfers the blank page removed data using the reference information.

15. The method of processing an image according to claim 13, further comprising transferring the blank page data using the first reference information and transferring the blank page removed data using the second reference information depending on whether or not a total size of the blank page data and the blank page removed data is equal to or larger than a predetermined threshold value.

\* \* \* \* \*